Nov. 8, 1966  MINORU NAGATA ET AL  3,284,696
STABLE POWER SOURCE CIRCUIT

Filed June 18, 1963  2 Sheets-Sheet 1

United States Patent Office 3,284,696
Patented Nov. 8, 1966

3,284,696
STABLE POWER SOURCE CIRCUIT
Minoru Nagata, Kodaira-shi, Katsunobu Abe, Kitatama-gun, Tokyo-to, and Kiyoshi Takeuchi, Hachioji-shi, Japan, assignors to Kabushiki Kaisha Hitachi Seisakusho, Tokyo-to, Japan, a joint-stock company of Japan
Filed June 18, 1963, Ser. No. 288,643
Claims priority, application Japan, June 22, 1962, 37/25,529
5 Claims. (Cl. 323—48)

This invention relates to stable power source circuits and more particularly to new stable power source circuits having highly desirable features.

Heretofore, several methods and means of stabilizing output voltage, such as methods of stabilization of alternating-current power source voltage, stabilization by means of gas discharge tubes, and stabilization by means of semiconductor elements, particularly voltage regulator diodes, have been known in the prior art. However, all of these methods and means have been accompanied by certain disadvantages and difficulties as will be described more specifically hereinafter.

It is an object of the present invention, in its broader aspects, to eliminate these disadvantages and difficulties.

More specifically, it is an object of the invention to provide circuits whereby the voltage of a large number of output windings can be stabilized simultaneously and readily.

The nature, principles, and details of the present invention, as well as the above-stated disadvantages of known methods of stabilization, will be best understood by reference to the following description when taken in conjunction with the accompanying drawings in which like parts are designated by like reference numerals and letters, and in which:

FIG. 1b is a graphical representation showing static characteristic curves of a diode such as that shown in FIG. 1a;

Figure 3:
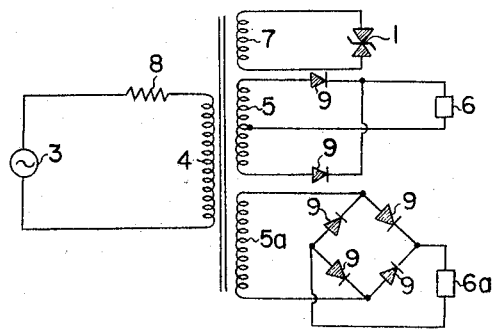
FIG. 3 is a circuit diagram of stable power source circuit indicating the principle of the present invention.
Figure 6:
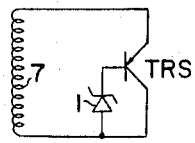
Figure 7:
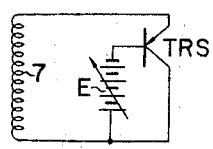
Figure 8:
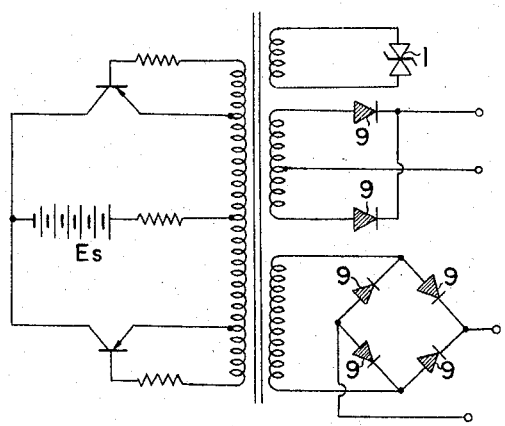
Figure 9:
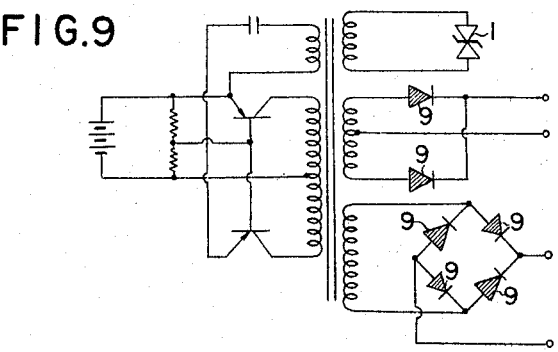

FIGS. 4 through 7, inclusive, are connection diagrams showing examples of modifications of a principal part of the circuit shown in FIG. 3; and FIGS. 8 and 9 are circuit diagrams indicating applications of the present invention to D.C.-D.C. converters.

Figure 1A:
FIG. 1a is an electrical symbolic diagram indicating a voltage regulator diode.
Figure 1B:
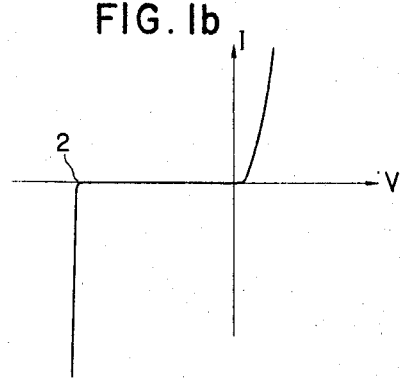
Figure 2:
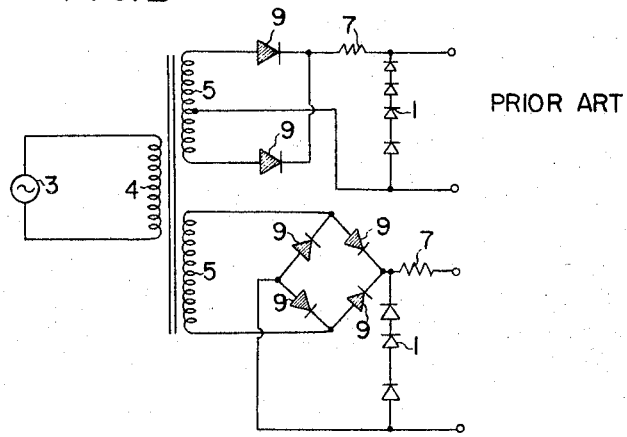
FIG. 2 is an electrical circuit diagram of a stable power source circuit of heretofore known type in which voltage regulator diodes are used.

As mentioned hereinbefore conventional methods have had disadvantageous features. More specifically, the afore-mentioned methods of stabilization of alternating-current power source voltage, while enabling simultaneous stabilization of the voltages of a large number of output windings, are disadvantageous in that their practical application is accompanied by difficulties in the electrical and mechanical construction of their required means. The gas discharge tube method has the disadvantage of low mechanical strength and the disadvantage of considerably larger physical size of apparatus in comparison with that in which semiconductor elements are used. Furthermore, while the stabilization method depending on semiconductor elements affords construction of relatively miniature size, it requires an extremely large number of voltage regulator diodes, as is indicated in FIG. 2, in order to stabilize voltages of several tens of volts or higher. The reason for this necessity is that, in the present state of the art, the breakdown voltage 2 (FIG. 1b) of a voltage regulator 1 as shown in FIG. 1a is low. Accordingly, this method has had certain disadvantages in fabrication and assembly from the viewpoint of economy.

The present invention which contemplates eliminating the above-described various disadvantages and difficulties will now be described with respect to a few embodiments.

Referring to FIG. 3, which indicates the principle of the present invention, power is supplied to the circuit by an alternating-current power source 3 to the input winding 4 of a power transformer through an impedance 8 for impedance drop (unnecessary in the case when the impedance due to the input winding 4 is sufficiently high). The said power transformer has output windings 5 and 5a supplying power to loads 6 and 6a, respectively, and a control winding 7 which is connected in series with voltage regulator diodes 1. The diode having constant voltage characteristics, e.g., a Zener diode, herein is referred to as "regulator diode." The circuits of the said output windings are provided with rectifying diodes 9 connected as shown.

The circuit of the above-described composition and arrangement operates in the following manner. A certain voltage is continually applied to the input winding 4. This voltage is transformed by the control winding 7 and is impressed of the voltage regulator diodes 1. In the case when this voltage so transformed is substantially equal to the breakdown voltage of the diodes 1, constant voltage is maintained, but when the said voltage so transformed rises above the breakdown voltage of the diodes 1, the said breakdown voltage is exceeded, and a working voltage is introduced. Accordingly, the impedance is lowered and a large current flows through the control winding 7. When current flows in winding 7, current also flows in winding 4 in accordance with the ratio of winding turns between windings 4 and 7. Since an impedance 8 for impedance drop is connected to the input winding 4, the input voltage is reduced thereby, and a constant voltage is caused to be applied continually to the two ends of the input winding 4. That is, voltages across the terminals of control winding 7 as well as of input winding 4 can be determined by the ratio of these two windings. Accordingly, when the voltage across the terminals of control winding 7 is kept constant by a diode, the voltage across the terminals of winding 4 eventually becomes constant irrespective of voltage variations at the power source 3. Consequently, consistency in the voltage of winding 4 in spite of voltage variations at power source 3 denotes that the variant in the power source voltage is the result of the droppage in resistor 8. Consequently, the peak values of the voltages generated in the output windings 5 and 5a become constant, and, therefore, the rectified output voltage is also stabilized. The reason for this is that, even when the peak value of the voltage at power source 3 varies while the peak voltage across the terminals of winding 4 is constant, the voltage to be generated in winding 5 also is maintained constant irrespective of the voltage change at power source 3.

Figure 4:
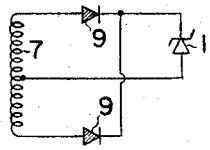
Figure 5:
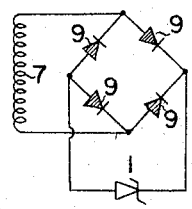

Other embodiments of the present invention may be created to produce the same operational effect as described above by modifying the control winding circuit as indicated in FIGS. 4 through 7, inclusive. In the case of a control winding provided with a tap as shown in FIG. 4, control can be effected with a single voltage regulator diode 1. In the case of a tapless control winding, control is effected with a single voltage regulator diode 1 through a bridge rectifying circuit as illustrated in FIG. 5. FIG. 6 shows a circuit whereby the same operational effect is obtained through a combination of a transistor and a smaller type of voltage regulator diode. FIG. 7 shows a circuit wherein, with only a transistor and by varying the voltage of a voltage source E, the magnitude of the constant voltage can be freely selected within a certain range.

The circuit of the above-described arrangement according to the present invention can be operated for both high voltage and low voltage by changing the winding turn ratio of the input winding and the control winding. If, for the circuit of the control winding 7 and the diode 1, circuits whose characteristics are matched are available and are provided in plurality for one transformer, a power source of further stability is obtained. Furthermore, stabilization is effected uniformly even if there are a large number of output windings. Of course, a load can be connected to the control winding to obtain an output without any adverse result, if the circuit is operated within its normal range.

While a rectangular wave is ideal for the alternating-current waveform, it is possible through the use of the circuit of this invention to effect, easily, stabilization which is 5 to 10 times that obtainable by conventional means even in the case of a sine wave. For this reason, the circuit of this invention is highly suitable for use in a direct-current converter wherein a rectangular wave oscillator is used as indicated in FIG. 8. By the circuit arrangement shown in FIG. 8, moreover, it is possible to obtain a stable direct-current of any desired magnitude through the use of a power source E$s$ with large voltage fluctuation. Furthermore, excellent stabilization can be effected also in the case of rectified commercial power supply and in the case of power supplied by a direct-current generator.

By inserting voltage regulator diodes in one winding of the transformer output of an LC oscillator as indicated in FIG. 9, it is possible to control the fluctuations of the oscillator output amplitude arising in accordance with fluctuations of a power source E$s$ and to stabilize, simultaneously, the other numerous and various winding outputs.

Although the present invention has been described with respect to particular embodiments thereof, it is not to be so limited as changes and modifications may be made therein which are within the full intended scope of the invention, as defined by the appended claims.

What is claimed is:

1. A stable power source circuit comprising a transformer having a primary winding connected to the power source side of the circuit, secondary windings connected to respective loads, and a tertiary winding for control and a pair of voltage regulator diodes which are connected together in mutually opposed directions and are further connected in series to the said tertiary winding.

2. A stable power source circuit comprising: a transformer having a primary winding connected to the power source side of the circuit, secondary windings connected to respective loads, and a tertiary winding for control; a pair of diodes which are connected together in mutually opposed directions and are further connected in series to the two ends of the said tertiary winding; and a voltage regulator diode connected between the junction of the said two diodes and a center tap provided in the said tertiary winding.

3. A stable power source circuit comprising: a transformer having a primary winding connected to the power source side of the circuit, secondary windings connected to respective loads, and a tertiary winding for control; a bridge rectifying circuit the input junctions of which are connected to the two ends of the said tertiary winding; and a voltage regulator diode connected to the output junctions of the said bridge rectifying circuit.

4. A stable power source circuit comprising: a transformer having a primary winding connected to the power source side of the circuit, secondary windings connected to respective loads, and a tertiary winding for control; a transistor, its emitter and collector being connected to respective ends of the said tertiary winding; and a voltage regulator diode connected between the base and the collector of the said transistor.

5. A stable power source circuit comprising: a transformer having a primary winding connected to the power source side of the circuit, secondary windings connected to respective loads, and a tertiary winding for control; a transistor, its emitter and collector being connected to respective ends of the said tertiary winding; and a direct-current power source connected between the base and the collector of the said transistor.

References Cited by the Examiner

UNITED STATES PATENTS

| 3,036,262 | 5/1962 | Welch | 323—48 |
|---|---|---|---|
| 3,070,743 | 12/1962 | Harper | 323—86 X |
| 3,102,226 | 8/1963 | Borkovitz | 323—22 |
| 3,137,811 | 6/1964 | Kirk | 323—22 |
| 3,182,249 | 5/1965 | Pahlavan | 323—87 |
| 3,184,675 | 5/1965 | Macklem | 323—50 |

FOREIGN PATENTS 1,078,611  3/1960  Germany.

JOHN F. COUCH, *Primary Examiner.*

LLOYD McCOLLUM, *Examiner.*

W. E. RAY, *Assistant Examiner.*